May 9, 1967 KIICHI KOMATSUBARA ET AL 3,319,208
VARIABLE NEGATIVE-RESISTANCE DEVICE
Filed May 24, 1966 2 Sheets-Sheet 1
FIG. 1
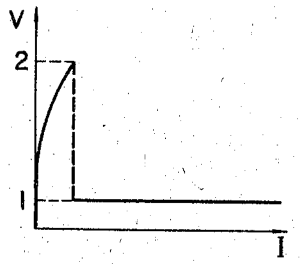
FIG. 2
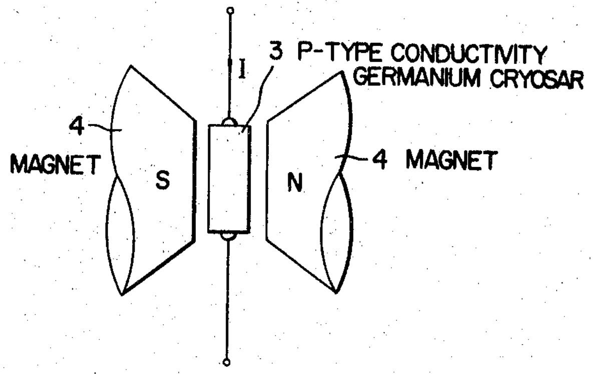
FIG. 3
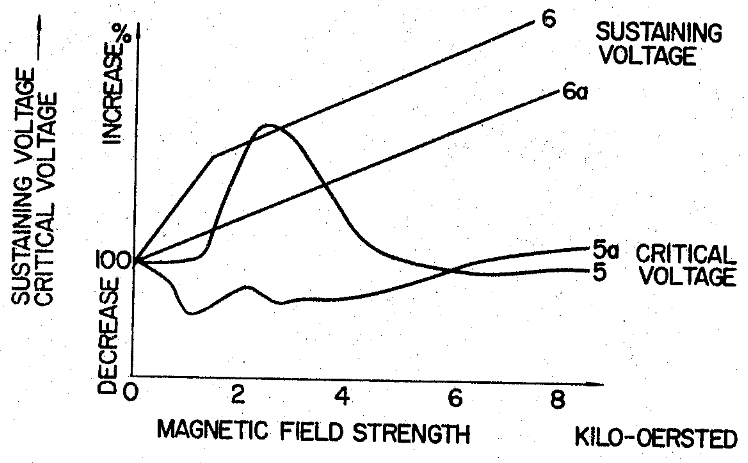
(a) FIG. 4 (b)
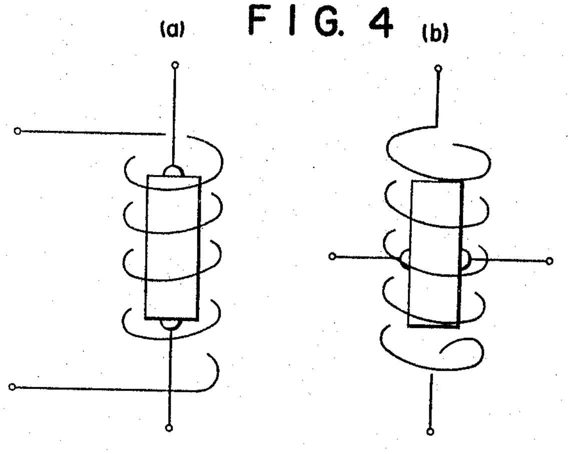
INVENTORS
KIICHI KOMATSUBARA
HIROKAZU KURONO
BY
H. Edward Mestern INVENTORS
KIICHI KOMATSUBARA
HIROKAZU KURONO
BY
H. Edward Mestern United States Patent Office 3,319,208

Patented May 9, 1967

3,319,208

VARIABLE NEGATIVE-RESISTANCE DEVICE

Kiichi Komatsubara and Hirokazu Kurono, both of Tokyo-to, Japan, assignors to Kabushiki Kaisha Hitachi Seisakusho, Tokyo-to, Japan, a joint-stock company of Japan Filed May 24, 1966, Ser. No. 552,475
9 Claims. (Cl. 338—32)

This application is a continuation-in-part of prior application Ser. No. 312,654 filed on Sept. 30, 1963, in the name of Kiichi Komatsubara and Hirokazu Kurono, and entitled, "Variable Negative-Resistance Device," and now abandoned.

The present invention relates to a so-called cryosar, or a low temperature negative-resistance semiconductor element which shows negative resistance at an extremely low temperature, and more particularly to controlling of the characteristics in cryosar by imparting a magnetic field thereto.

It has heretofore been known that Group IV semiconductors in the Periodic Table such as Ge, Si, etc., or III–V intermetallic compound semiconductors such as GaAs, InSb, InP, etc., indicate negative-resistance characteristics at an extremely low temperature below 77° K., when a majority impurity for determining the proper conductivity type is contained in the abovementioned semiconductors to the order of $10^{14}$–$10^{16}$ atoms/cc. for example, and a minority impurity doped as a compensator to decrease the conductivity type against that doped in the first-mentioned impurity is included in the semiconductor at a ratio between 40% and 90% with respect to the majority impurity. These devices have not pn-junction parts and the carriers corresponding to the majority impurity is increased by the impact ionization with the minority impurity. The voltage-current characteristics of said semiconductor element with said majority impurity is examined at an extremely low temperature below 77° K. This highly compensated semiconductor element having negative-resistance characteristics under such extremely low temperature is called "Cryosar." (A. L. McWhorther and R. H. Rediker: Proceeding of the I.R.E., 47, 1959, page 1207.)

It is an object of the present invention to provide a new variable negative-resistance semiconductor device which enables to obtain arbitrary negative-resistance characteristics.

It is another object of the present invention to provide a new variable negative-resistance semiconductor device, wherein selection of switching characteristics of the device is easy.

It is another object of the present invention to provide a new variable negative-resistance semiconductor device which generates electrical vibrations.

It is still another object of the present invention to provide the variable negative-resistance semiconductor device which is capable of modulating the abovementioned oscillation frequency.

The nature and details of the present invention as well as the manner, in which the foregoing objects, other objects and advantages may best be achieved, will become more apparent by reference to the following description presented principally with respect to preferred examples of embodiment of the invention, when read in conjunction with the accompanying drawing, in which:

FIG. 1 is a typical voltage-current characteristic curve of a known cryosar;

FIG. 2 is a schematic diagram to explain one example of the present invention;

FIG. 3 is a graph showing variations in sustaining voltage and critical voltage of a cryosar when the strength of a magnetic field to be impressed on the cryosar is changed;

Figure 5:
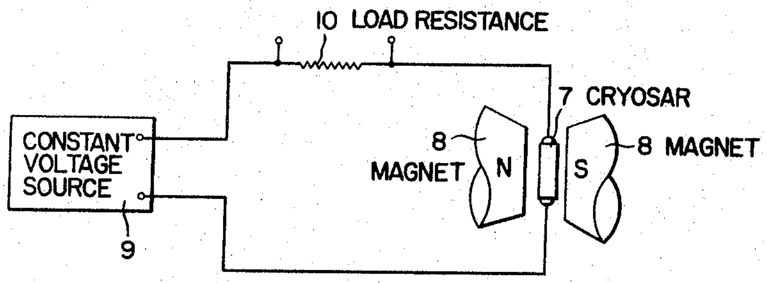
Figure 8:
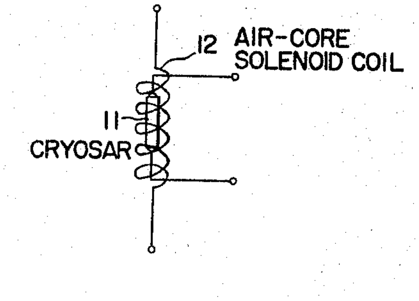
Figure 6:
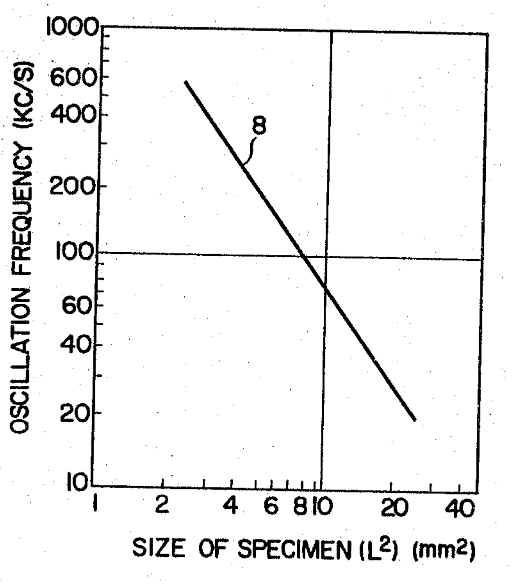
Figure 7:
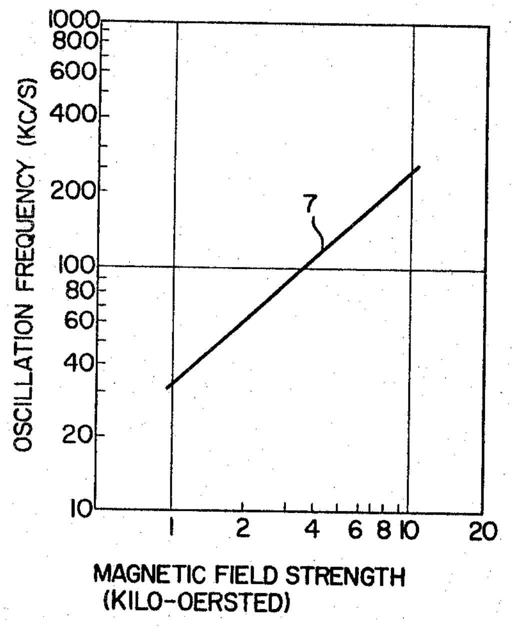

FIG. 4(*a*) and FIG. 4(*b*) are schematic diagrams showing the direction in which the magnetic field is impressed on the cryosar, and, in these figures, the cryosar element is accommodated within a superconductive magnet;

FIG. 5 is a schematic diagram of a circuit construction according to the present invention indicating a manner to impress a magnetic field on the cryosar element with magnet poles;

FIG. 6 is a graphical representation showing the relationship between oscillation frequency and cross-sectional area of a specimen according to the invention;

FIG. 7 is another graphical representation showing the relationship between oscillation frequency and magnetic field strength; and FIG. 8 is a schematic diagram showing a cryosar element inserted in an air-core solenoid coil to obtain the same result as shown in FIG. 7.

Referring to FIG. 1, the abscissa indicates current and the ordinate voltage. In this graph, the negative-resistance region is shown by a broken line in the voltage-current characteristic curve. The reference numeral 2 on the ordinate is a critical voltage at which the negative-resistance phenomenon commences, and the reference numeral 1 on the same axis is a sustaining voltage at which the negative-resistance phenomenon terminates. These two terms are used very frequency with devices having negative-resistance characteristics, and, from the point of utilizing the negative-resistance element, these sustaining and critical voltages are required to have desired values. In this case, various types of elements are fabricated, from which an element having the desired value of the negative-resistance characteristics for a specific purpose is selected through examination. However, this work is extremely complicated and, moreover, results in poor yield.

In order therefore to eliminate the disadvantages in the conventional negative-resistance element and to attain the aforementioned various objects specific to the present invention, we have relied on the facts that, when a magnetic field is impressed on a cryosar, the voltage-current characteristics of the cryosar such as, for example, critical voltage and sustaining voltage vary in accordance with the strength of the magnetic field, and that, when the magnetic field exceeds a certain critical condition, the voltage commences vibration between the sustaining voltage 1 and critical voltage 2.

In FIG. 2, the principal part of the device according to the present invention comprises a germanium cryosar element of p-type conductivity 3 inserted between magnet poles 4. In this cryosar element 3, there are contained $10^{14}$–$10^{16}$ atoms/cc. of a p-type impurity to determine the p-type conductivity of the element, and further an n-type impurity to compensate the p-type impurity at the compensation degree $$\left(=\frac{\text{minority imourities}}{\text{majority impurities}}\right) \text{ of } 0.5\text{–}0.9$$

The voltage-current characteristics of this cryosar element under the low temperature conditions are the same as that shown in FIG. 1. Now, when a magnetic field H is imparted to this cryosar element in the direction perpendicular to the current flowing in the cryosar, while it is being dipped in liquid nitrogen solution, the characteristics of the cryosar change. The results of experiments as to how the sustaining voltage and critical voltage within the voltage-current characteristics of the cryosar change, when the strength of the magnetic field to be impressed on cryosar 3 is varied is clearly shown in FIG. 3.

In the aforementioned example, the direction of the magnetic field to be impressed on the cryosar element is perpendicular with respect to the direction of the current flow, and even if the direction of impression of the magnetic field is in parallel with the current direction, the cryosar element shows peculiar characteristics. That is, in case the current is caused to flow in the vertical direction as above-mentioned, the critical voltage 2 increases at the beginning, when the magnetic field is applied, and, in case the current is caused to flow in parallel, the critical voltage 2 decreases. As an example, when a cryosar element as mentioned above is inserted in an air-core solenoid coil, as shown in FIG. 4(*a*), the switching characteristics of the element becomes controllable by adjusting the current flowing in the solenoid coil. In FIG. 3, the curves 6 and 6' show variations in the sustaining voltage 1 and the curves 5 and 5' the variation in the critical voltage. In addition, it is worthy of note that such characteristics are particularly sensitive to the crystallographic axis in the direction of the magnetic field and exhibits remarkable anisotropy.

In the circuit construction of FIG. 5, when the strength of the magnetic field impressed on the cryosar element becomes more than 1,000 oersteds, it is possible to take out high frequency oscillation output at the terminals of the negative resistance 10. This is a new phenomenon which derives from the fact that the element itself shows instability in its characteristics (i.e., oscillation phenomenon). In other words, when the magnetic field is impressed on the cryosar element, both critical and sustaining voltages are subjected to variation; however, when the strength of the magnetic field exceeds a certain critical condition, the voltage impressed begins to vibrate between the critical and sustaining voltages. In this case, if the strength of the magnetic field is all the more increased, the vibratory period of the voltage becomes improved and at the same time oscillation frequency increases. This vibratory period greatly improves as the average value of the current flowing in a specimen becomes greater. The principle of such oscillation phenomenon is not so clear at the present stage, but it is inferred that some periodical instability due to the phenomenon of dielectric breakdown may take place in the element, considering the magnetic field strength of the oscillation frequency, cross-sectional area of a specimen, and dependability of the element on the impurity concentration.

In FIG. 5, a square rod of a p-type germanium single crystal containing $10^{15}$ atoms/cc. of In and 0.8 x $10^{15}$ atoms/cc. of Sb, and having a dimension of 2.7 x 2.7 x 5.15 $mm.^3$ is used as a highly compensated cryosar 7. At both ends of the cryosar in its longitudinal direction, small pieces of indium are fixed by the alloying method so as to form a resistance contact between indium and the semiconductor, thereby providing electrodes on these portions. When direct current of about 5 ma. average is caused to flow in the abovementioned element by adjusting the voltage at the constant voltage source 9, and then the strength of magnetic field is gradually increased from zero, oscillation commences at about 1 kilo-oersted and high frequency oscillation voltage is generated at both terminals of the negative resistance 10. The oscillation frequency at this time is about 30 kc./s., and, when the magnetic field strength is further augmented, the oscillation frequency increaseses linearly up to about 10 kilo-oersted, as the result of which it reaches 200 kc./s. This relationship between the oscillation frequency and the magnetic field strength at the time of the strength being 10,000 oersteds is shown in FIG. 7.

Also, the oscillation frequency depends on the cross-section of the specimen, and the smaller the cross-section, the more the oscillation frequency increases. This relationship between the cross-section of the specimen and oscillation frequency is shown in FIG. 6.

The same result as abovementioned can be obtained in case the element 11 is inserted in an air-core solenoid coil 12 and direct current is caused to flow in the coil as shown in FIG. 8. In this case, if alternating current is superposed on the direct current flowing through the coil, it will be possible to give frequency modulation to the oscillating high frequency. Further, when a superconductive solenoid coil, in which a superconductive wire is used as the winding for the coil is employed, it is possible to increase its operating efficiency and simultaneously to miniaturize the whole device.

As described above, the variable negative resistance device according to the present invention is capable of controlling easily switching actions of the device by control of the magnetic field strength since the critical voltage and sustaining voltage vary with variations in the magnetic field. Furthermore, the instant device is able to give the cryosar element required characteristics by varying the magnetic field strength from outside in case the initial characteristics of the cryosar have deviated from the predetermined value. Moreover, by increasing the magnetic field strength, voltage vibration (or oscillation) can be easily produced within the cryosar element and yet its oscillation frequency can be changed in accordance with the magnetic field strength.

Furthermore, since the impedance of the instant device is higher than that of an ordinary semiconductor device, it may be operated in cooperation with devices such as cryotron and superconductive magnets for a wide range of use.

It should be understood, of course, that the foregoing disclosure relates to only preferred embodiments of the invention and that it is intended to cover all such variations and modifications of the examples of the invention herein chosen for the purposes of the disclosure, which do not constitute departures from the spirit and scope of the invention as set forth in the appended claim.

What is claimed is:

1. A variable negative resistance device comprising: a semiconductor element of a single conductivity type containing $10^{14}$–$10^{16}$ atoms/cc. of p-type and n-type impurities, in which one impurity is 50–90% of the other impurity; electrodes for supplying current to said element provided at opposite positions of said element; means to maintain said element at an extremely low temperature of 77° K. and below; and means to impart a magnetic field to said element maintained at said extremely low temperature.

2. The device according to claim 1, wherein said semiconductor element is one selected from group consisting of Ge, Si, GaAs and InSb.

3. The device according to claim 1, wherein the magnetic field is impressed on said semiconductor element in the direction perpendicular to the direction of the current flowing in said element due to an increase in the voltage of said current.

4. The device according to claim 1, wherein the magnetic field is impressed on said semiconductor element in the direction parallel to the current flowing in said element due to a decrease in the voltage of said current.

5. The device according to claim 1, wherein oscillation takes place when the magnetic field strength reaches 10,000 oersteds and above.

6. The device according to claim 5, wherein said oscillation effects vibration of the voltages of said current.

7. The device according to claim 1, wherein said semiconductor element is germanium, in which $10^{15}$ atoms/cc. of In and about 80% of Sb with respect to In are contained.

8. The device according to claim 1, wherein an air-core solenoid is used as the means for impressing said magnetic field, into which said semiconductor device is inserted.

9 The device according to claim 8, wherein a superconductive coil is used in place of said air-core solenoid coil.

References Cited by the Examiner

UNITED STATES PATENTS

| | | | |
|---|---|---|---|
| 2,736,858 | 2/1956 | Welker | 338—32 |
| 2,906,945 | 9/1959 | Weiss | 324—45 |
| 2,924,633 | 2/1960 | Sichling et al. | 338—32 |
| 2,966,598 | 12/1960 | Mackay | 338—32 |
| 2,979,668 | 4/1961 | Dunlap | 338—32 |
| 3,011,133 | 11/1961 | Koenig et al. | 331—107 |

RICHARD M. WOOD, *Primary Examiner.*

W. D. BROOKS, *Assistant Examiner.*